United States Patent [19]
Ogram

[11] Patent Number: 5,991,738
[45] Date of Patent: *Nov. 23, 1999

[54] AUTOMATED CREDIT CARD PROCESSING

[76] Inventor: Mark E. Ogram, 780 S. Freeman Rd., Tucson, Ariz. 85748

[ * ] Notice: This patent is subject to a terminal disclaimer.

[21] Appl. No.: 08/968,701

[22] Filed: Nov. 12, 1997

Related U.S. Application Data

[63] Continuation of application No. 08/597,017, Feb. 5, 1996, Pat. No. 5,822,737.

[51] Int. Cl.[6] ......................................................... G06F 17/60
[52] U.S. Cl. .......................... 705/26; 235/375; 340/825.3; 340/825.31
[58] Field of Search ..................................... 235/375, 379, 235/380, 381; 340/825.3, 825.31, 825.34, 825.35; 705/1, 26, 27; 902/2

[56] References Cited

U.S. PATENT DOCUMENTS

| | | | |
|---|---|---|---|
| 5,206,488 | 4/1993 | Teicher | 235/380 |
| 5,220,501 | 6/1993 | Lawlor et al. | 902/24 X |
| 5,351,296 | 9/1994 | Sullivan | 380/24 |
| 5,420,405 | 5/1995 | Chasek | 235/379 |
| 5,511,122 | 4/1996 | Atkinson | 380/25 |
| 5,515,307 | 5/1996 | Aiello et al. | 364/717 |
| 5,557,518 | 9/1996 | Rosen | 235/379 X |
| 5,608,801 | 3/1997 | Aiello et al. | 380/46 |
| 5,621,797 | 4/1997 | Rosen | 380/24 |
| 5,627,972 | 5/1997 | Shear | 395/200.18 |
| 5,629,982 | 5/1997 | Micali | 380/30 |
| 5,642,419 | 6/1997 | Rosen | 380/23 |
| 5,671,280 | 9/1997 | Rosen | 380/24 |
| 5,703,949 | 12/1997 | Rosen | 380/21 |
| 5,710,887 | 1/1998 | Chelliah et al. | 705/26 |
| 5,724,424 | 3/1998 | Gifford | 380/24 |
| 5,729,594 | 3/1998 | Klingman | 705/26 X |
| 5,802,497 | 9/1998 | Manasse | 705/27 |
| 5,809,144 | 9/1998 | Sirbu et al. | 380/25 |
| 5,815,657 | 9/1998 | Williams et al. | 235/380 |
| 5,822,737 | 10/1998 | Ogram | 705/26 |
| 5,850,442 | 12/1998 | Muftic | 380/21 |

OTHER PUBLICATIONS

Online Resources & Commun: "Electronic Transactions"; press release, Aug. 1993.

"First Data Brings Secure Payment Processing to the Internet with Netscape Communications Software"; Netscape press release; Mountin View, California, Nov. 1994.

"Wal–Mart to Operate Microsoft Programs for On–Line Sales"; Wall Street Journal, No Date.

Clark; "Oracle to Make Net Software With VeriFone"; Wall Street Journal, No Date.

Wells Fargo Bank et al; "Internet Cash & Carry Will offer merchants secure credit/debit transactions on the Internet in cooperation with Cybercash"; press release, Dec. 1994.

(List continued on next page.)

*Primary Examiner*—Edward R. Cosimano

[57] ABSTRACT

An automated payment system particularly suited for purchases over a distributed computer network such as the Internet. In such a distributed computer network, a merchant or vending computer contains certain promotional information which is communicated to a customer's computer. Based upon the promotional information, the operator of the customer's computer decides to purchase the services or goods described by the promotional information. The customer's computer is linked to a payment processing computer and the customer's credit card number and the amount of the goods or services is transmitted to the payment processing computer. The payment processing computer automatically contacts a bank for verification of the credit card and amount; the bank transmits an authorization to the payment processing computer. The payment processing computer communicates a self-generated transaction indicia, and in some embodiments a password, to the customer's computer. In the embodiment where a password is used, the customer's computer uses the password with the merchant's computer in obtaining access to protected information or to establish shipping instructions.

19 Claims, 8 Drawing Sheets

OTHER PUBLICATIONS

Spyglass et al: "Internet tools vendors prep for commerce"; press release, Dec. 1994.

Wells Fargo: "Wells Fargo secured spot for Internet shopping"; press release, Mar. 1995.

Twin County Grocers; "N.J. grocer installs online debit card reader for food stamp transactions Installs online debt card reder that can process food stamp, credit and debit transactions"; press release, Apr. 1995.

Visa Intl et al: "Visa and Microsoft Publish Open Specifications to Enable Secure Transactions on the Internet"; press release, Sep. 1995.

Checkfree Corp.; "Checkfree gives secure Internet transactions top billing"; press release, Oct. 1995.

Netscape Communications et al: "Visa & Mastercard at Odds"; press release, Oct. 1995.

ISED Corporation; "New low–cost Hardware provides secure Financial Transactions via telephone and the internet"; press release, Nov. 1995.

"Commerce is slow to hit the Net"; press prelease, Nov. 1995.

MCI Communcation; "MCI diversifying through move into music business Launching a svc that sells compact discs & cassettes directly to the home via Internet & phones"; press release, Nov. 1995.

British Midland Airways; "BM Claims to be First Internet Booking Airline"; press release, Dec. 1995.

"IETF directs focus on Net standards; Seeks to reconcile security protocols"; press release, Dec. 1995.

Cybercash; "Virtual credit–card swiper maks banks feel secure Offers Internet users & merchants the ability to transact credit card payments over the Internet"; press release, Dec. 1996.

"Accept Credit Cards and Money Payments Over the Web! Totally Secure, Automated and Operational!", Jan. 1996.

Online Resources & Commun TransPhone; "TransPhone Accesses Online Resources' Banking Technology; Leading Protocol Adds Hundreds of Financial Services to Transaction Appliance"; press release, Jan. 1996.

Frieder the Source: press release, Jan. 1996.

Oracle Corp. and Verifone Inc.; press release, Feb. 1996.

Set Protocol press release from America Online, Feb. 1996.

NDC and CyberCash press release from America Online, Mar. 1996.

"Secure transaction Technology Specifications"; Visa International Service association and Microsoft Corporation; Version 1.0, 1995.

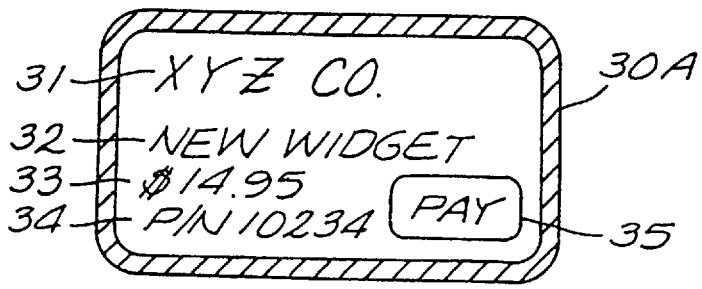
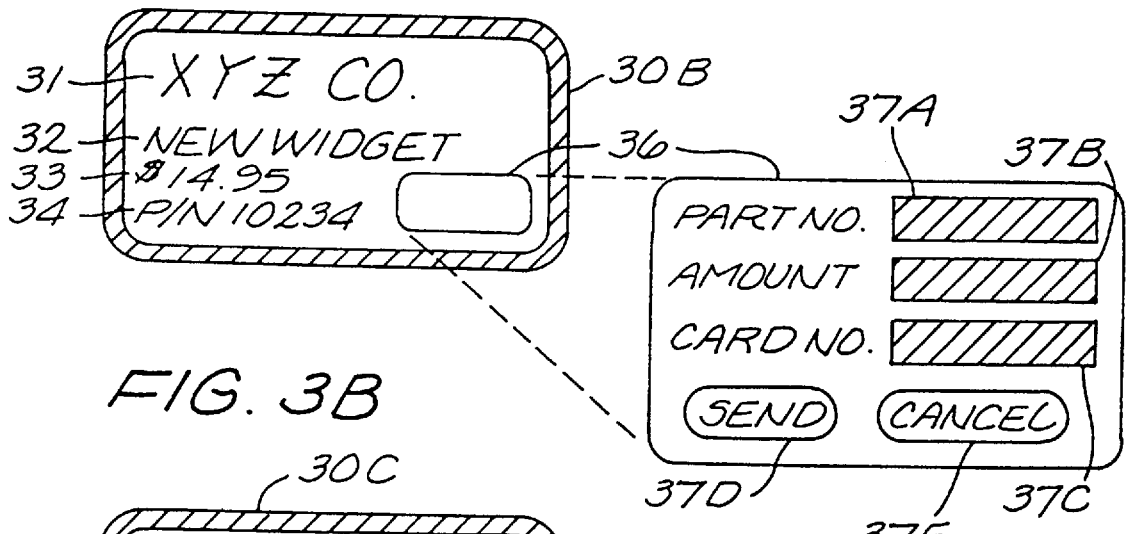
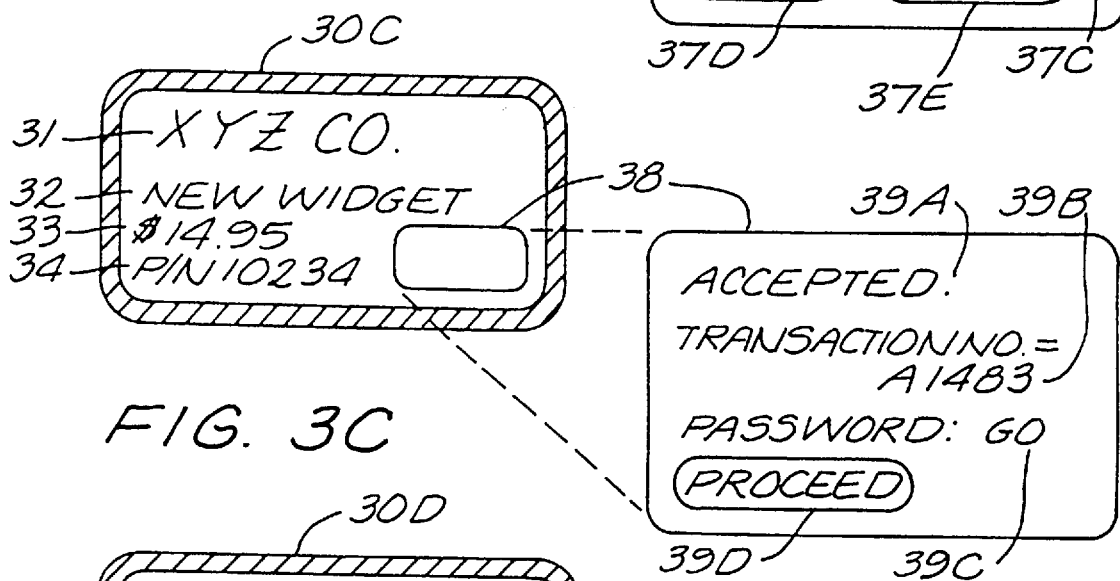
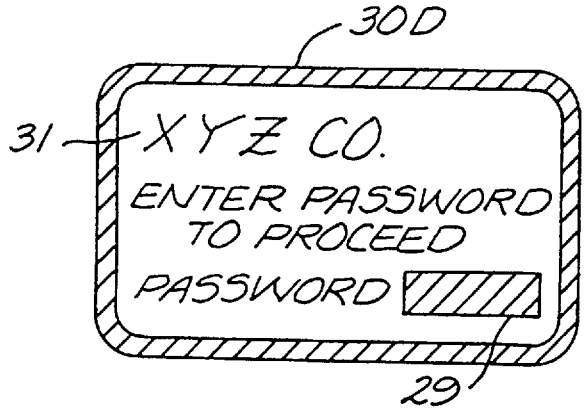
FIG. 3A
FIG. 3B
FIG. 3C
FIG. 3D

AUTOMATED CREDIT CARD PROCESSING

This is a continuation of U.S. patent applications, Ser. No. 08/597,017, filed Feb. 5, 1996, and entitled "Financial Transaction System", now U.S. Pat. No. 5,822,737, issued on Oct. 3, 1998.

BACKGROUND OF THE INVENTION

This invention relates generally to financial transactions and more particularly to transactions involving credit or debit cards.

The time is fast approaching where a significant amount of commerce will be conducted using distributed networks of computers such as the Internet. The reason this groundswell of commerce will occur is the ability of a single merchant to economically reach a vast number of potential customers at substantially no costs. Further, the customers are able to review a great number of vendors and their products with the ease of a few key strokes and clicks of the mouse.

Although there are vast numbers of merchants already using such networks, the sales volume has been particularly low due to a variety of reasons. One reason which has depressed commerce on the networks, is the difficulty with which customers can pay for their purchases.

A variety of techniques have been developed to cure this problem ranging from accepting phone orders to the establishment of another currency called "E-Cash".

Phone orders in response to merchant promotional materials creates a variety of problems. One major problem is the requirements for phone lines and personnel to receive and process the phone orders. Another hurdle is the simple fact that most customers have a single phone line to their residence and this line is used by the computer for accessing the network; the customer has to disconnect from the network to make the phone order.

Although E-Cash is a viable alternative, it is faced with some enormous problems which will be difficult or impossible to address. These include: counterfeiting problems; government reluctance to accept the concept; difficulties in getting access for handling E-Cash; and, the low number of users and merchants which can use E-Cash.

It is clear from the foregoing that there is a need for an efficient methodology and system to accept payment over distributed computer networks.

SUMMARY OF THE INVENTION

The present invention contemplates a totally automated system for securing payment via a distributed network of computers. In this context, the invention creates an automated payment system particularly suited for purchases over a network such as the Internet.

Although the present invention is described relative to the Internet, its application is not so limited and is intended to be used on any distributed computer system in which merchants and consumers interact for the purpose of supplying and purchasing goods or services.

In such a distributed computer network, a merchant or vending computer contains certain promotional information which is communicated to a customer's computer. This information is intended to give the customer sufficient information to make a decision on if the goods/services are acceptable.

As used within this discussion, the term "merchant computer" signifies a computer system which is used for the purpose of selling goods or services. The vendor itself does not necessarily own the computer; in some situations, the computer is operated on behalf of the merchant or vendor.

Based upon the promotional information, the consumer/operator of the customer's computer decides to purchase the services or goods described by the promotional information.

It is at this point where the present invention is particularly powerful as it provides a simple, easy, methodology and linkage for the customer to pay for the goods/services.

In this context, the customer's computer is linked to a payment processing computer and the customer's credit card number and the amount of the goods or services is transmitted to the payment processing computer. For security reasons, an encrypting software package is first downloaded to the customer's computer so that the credit card number is secure from "hackers" who might also be on the network.

Although the term "credit card" is used, the invention covers the use of any type of financial guarantee card such as automatic debit accounts, checking account numbers, savings account numbers, and other such devices obvious to those of ordinary skill in the art.

The payment processing computer automatically contacts a bank for verification of the credit card and amount; the bank transmits an authorization to the payment processing computer. This authorization, usually in the form of a number, is stored within the payment processing computer's memory for later reference.

The link or connection with the bank is terminated by the payment processing computer and the payment processing computer turns its attention to the customer's computer. The payment processing computer communicates a self-generated transaction indicia, and in some embodiments a password, to the customer's computer.

The transaction indicia is generated by the payment processing computer for proper record keeping. The transaction indicia is also used by the customer to verify that an order has been generated and accepted.

The password is defined by the merchant's computer for the payment processing computer to pass along to the customer's computer. The password is used by the customer's computer to gain access to restricted material within the merchant's computer.

As example, assume the merchant's computer is supplying information as to genealogy. As an initial process, the customer enters the name being researched and receives a preliminary report on the genealogy (the promotional material). To proceed though, and get the actual data, the customer must pay to access this further information.

To do so, the customer links with the payment processing computer, and in the manner outlined above, receives back the transaction indicia and the password. The payment processing computer links the customer computer back to the merchant computer; the customer provides the password to the merchant's computer and is given access to the full genealogy report.

As outlined in this example, in the embodiment where a password is used, the customer's computer uses the password with the merchant's computer in obtaining access to protected information or to establish shipping instructions.

The re-linking of the customer computer to the merchant computer is accomplished in a variety of ways. In the preferred embodiment, the payment processing computer obtains the merchant's address or Unique Recognition Location (URL) from the customer computer when the customer connects with the payment processing computer. This URL is used in a variety of ways, to identify the merchant, to establish the amount of the product/service, and to establish the return URL when the payment processing computer is done with its task for the customer computer.

By selective use of the URL on the merchant's part, the URL transmits a tremendous amount of information to the payment processing computer. As example, assume the URL for the home-page of the merchant is: http://merchant.com/widget.

When the merchant is selling a single product (a widget), this URL is easy to match to the product. When the merchant wants to sell a variety of widgets, then for a blue widget, the URL might be: http://merchant.com/widget/blue.

In some embodiments, the customer's computer is not linked back to the originating URL of the Merchant computer but rather to another URL. The return URL is stored in the payment processing computer and is used when the Merchant wants the customer/consumer to be passed back to a different location (i.e. where the restricted access information is accessible, or to inform the consumer that their card has been rejected).

The invention, together with various embodiments thereof, will be more fully explained by the accompanying drawings and the following descriptions.

DRAWINGS IN BRIEF

FIGS. 2A, 2B, 2C, 2D, and 2E graphically illustrate the connections and disconnections of the preferred embodiment.

FIGS. 3A, 3B, 3C, and 3D are frontal views of one embodiment of a consumer's display screen.

Figure 4A:
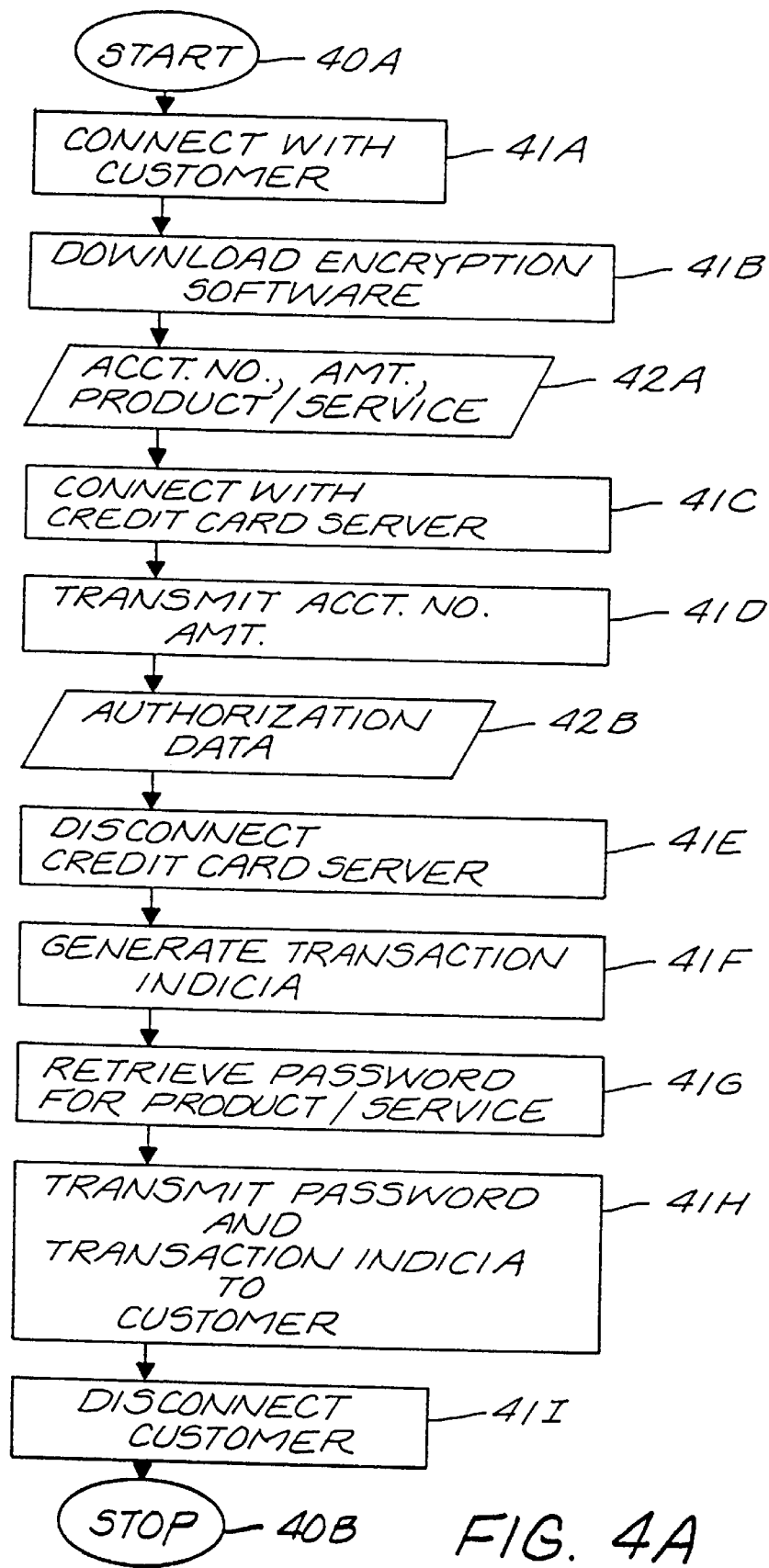

FIG. 4A is a flow-chart of the preferred embodiment's payment processing operation.

Figure 4B:
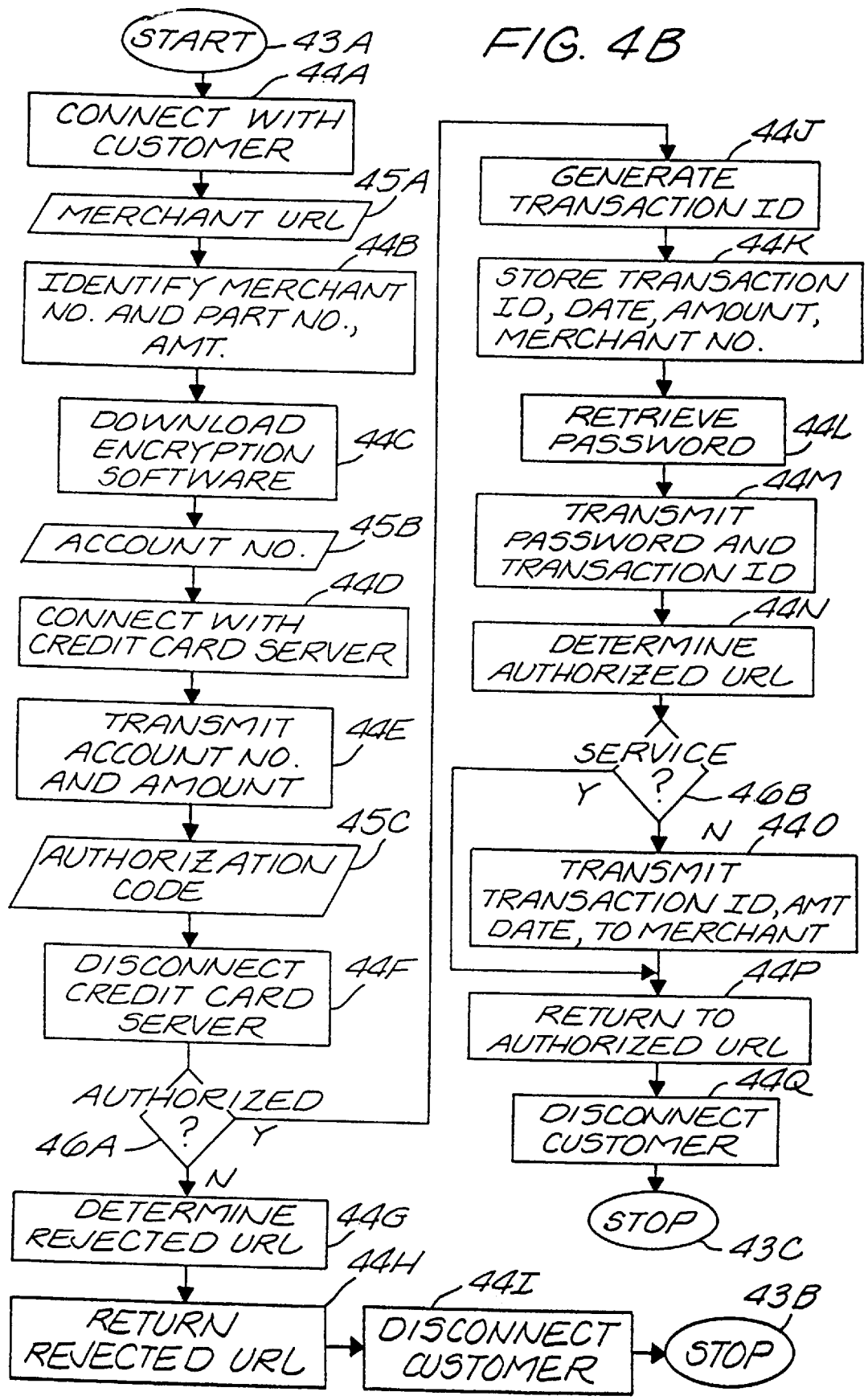

FIG. 4B is a flow-chart of an alternative embodiment's payment processing operation.

Figure 5:
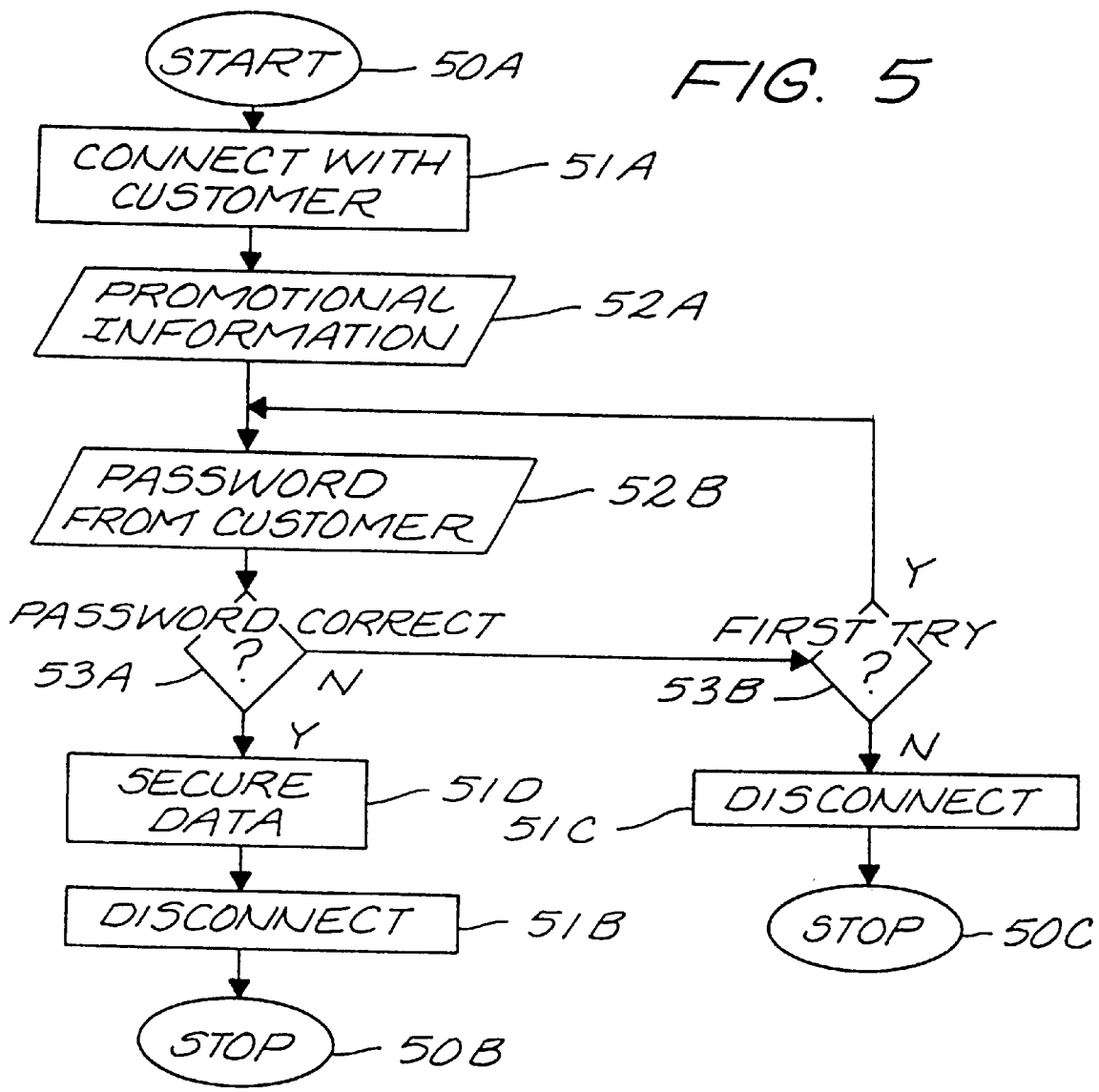

FIG. 5 is a flow-chart of the operation of the merchant's computer.

DRAWINGS IN DETAIL

Figure 1A:
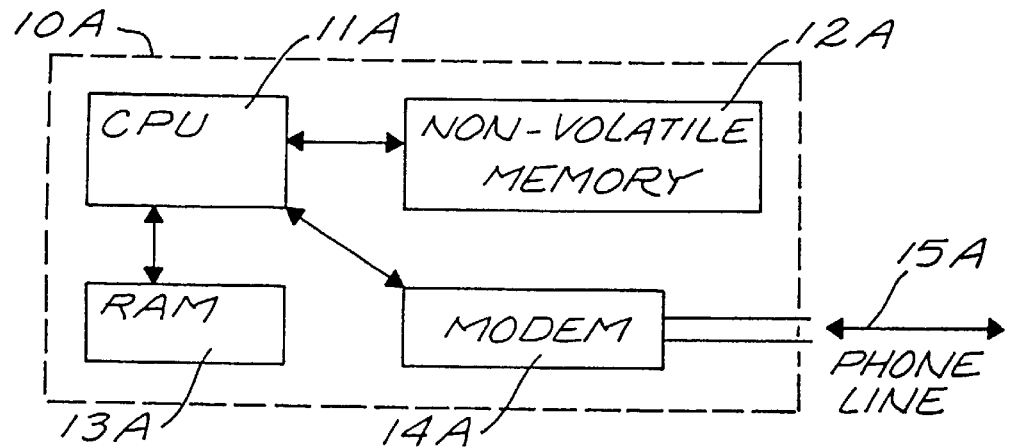
FIGS. 1A and 1B are block diagrams of the two computer configurations used in the preferred embodiment.
Figure 1B:
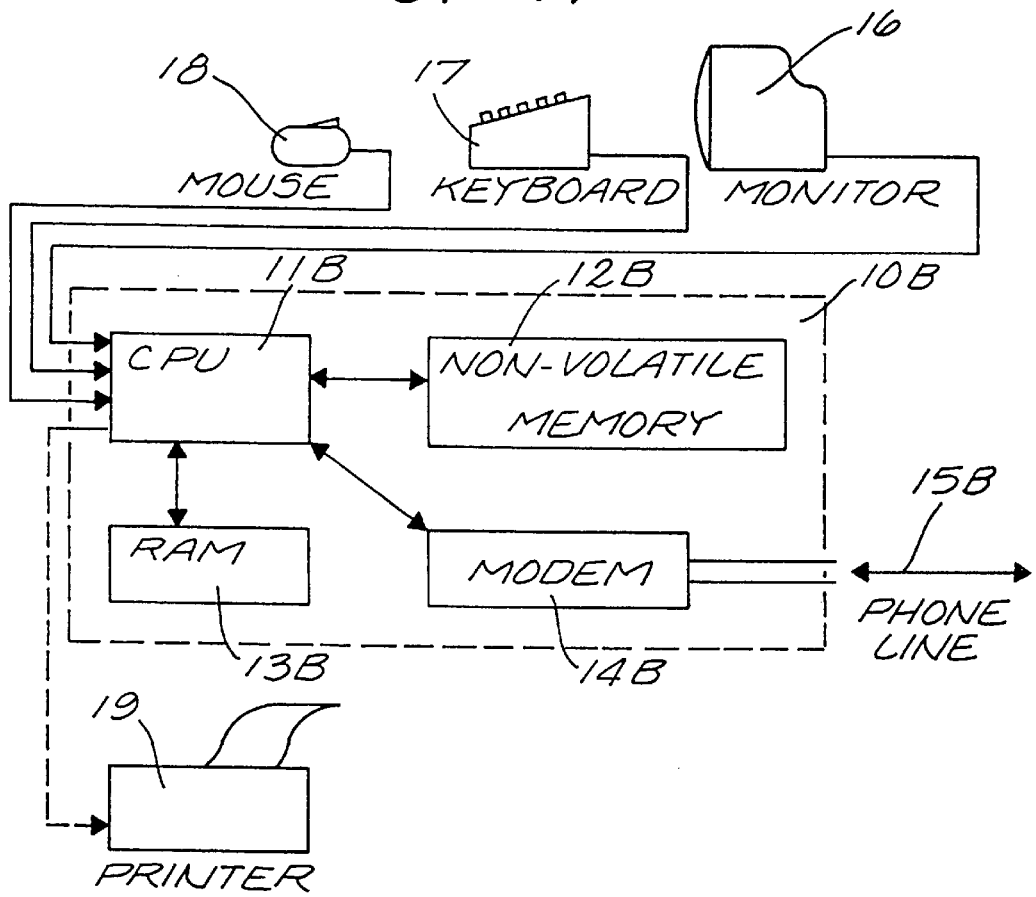

FIGS. 1A and 1B are block diagrams of the two computer configurations used in the preferred embodiment.

FIG. 1A illustrates the configuration of the preferred payment processing computer. As shown, computer 10A is a simple layout of a Central-Processing-Unit (CPU) 11A which uses both non-volatile memory 12A and Random-Access-Memory (RAM) 13A.

Communication to and from CPU 11A is via modem 14A which communicates with other computers via the network connected by phone line 15A.

Computer 10B, illustrated in FIG. 1B, shows the preferred . computer configuration used for the merchant computer and the customer computer. Again, CPU 11B is connected to memories RAM 13B and non-volatile memory 12B. In the case of the merchant computer, the promotional material is stored on non-volatile memory 12B and is retrieved and communicated by CPU 11B using modem 14B, which communicates by phone line 15B.

This system is able to communicate with an operator via monitor 16 for visual information. Monitor 16 is used for the perusal of the promotional material by the customer.

Keyboard 17 is used to communicate operator commands to CPU 11B. In like fashion, mouse input device 18 is also used for operator input to CPU 11B.

Optional printer 19 is used to create a hard copy of the material being displayed to the operator/customer via monitor 16.

The differences between the computers shown in FIG. 1A and 1B are pronounce since the payment processing computer of FIG. 1A does not require input or direction from a human operator. Rather, in the preferred embodiment, the payment processing computer runs totally automatically and collects all of the data and information it requires for its operation automatically from the computers with which it is linked and with what is stored in its memory.

Figure 1C:
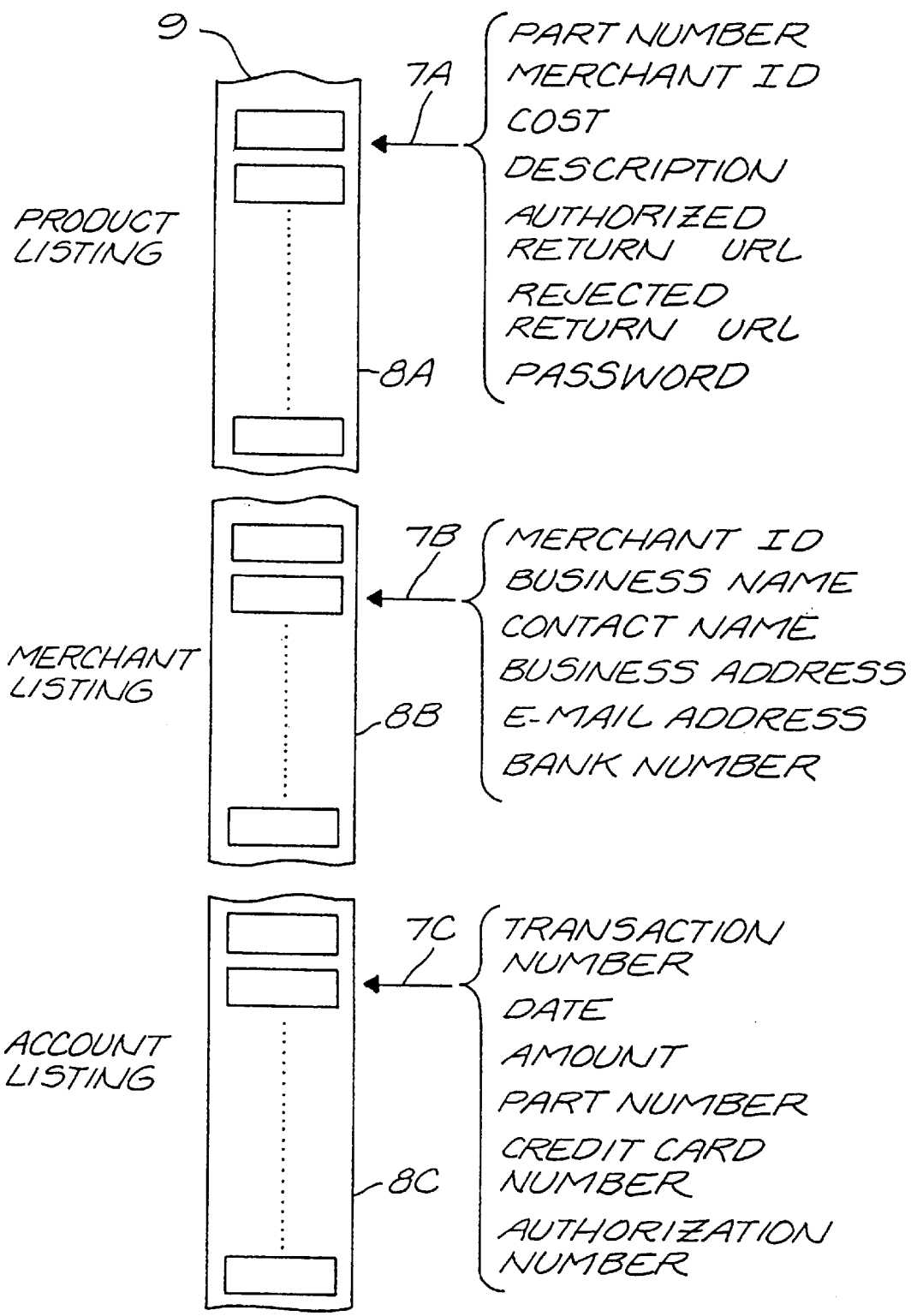
FIG. 1C is a graphical representation of the preferred memory organization for the computer illustrated in FIG. 1A.

FIG. 1C is a graphical representation of the preferred memory organization for the computer illustrated in FIG. 1A.

Memory 9, located preferably in non-volatile memory 12A, has three sections. The first section 8A is the product listing reference which is composed of multiple groupings. This data remains relative constant and is defined by the merchant. Each grouping, such as 7A, includes data identifying:

Part Number
Merchant Identification
Cost of Product/Service
Description of the Product/Service
Authorized Return URL
Rejected Return URL
Password The second section is for defining the merchant's information. Each grouping 7B within section 8B contains relative constant information such as:

Merchant Identification
Business Name
Contact Name within the Business
Business Address
E-Mail address for the Business
Bank Checking Number for the Business The third section 8C is an accounting listing which is constantly up-graded as new payments are processed. This section is used for making full accounting to the various merchants. Grouping 7C within section 8C contain:

Transaction Number
Date of transaction
Amount of the transaction
Part number involved in transaction
Credit Card Number
Authorization Number The authorization number is the indicia received from the bank indicating that the credit card charge has been accepted.

The use of memory 9 allows the payment processing computer to have access to the necessary information to handle the linkage and perform the proper accounting.

FIGS. 2A, 2B, 2C, 2D, and 2E graphically illustrate the connections and disconnections of the preferred embodiment.

Figure 2A:
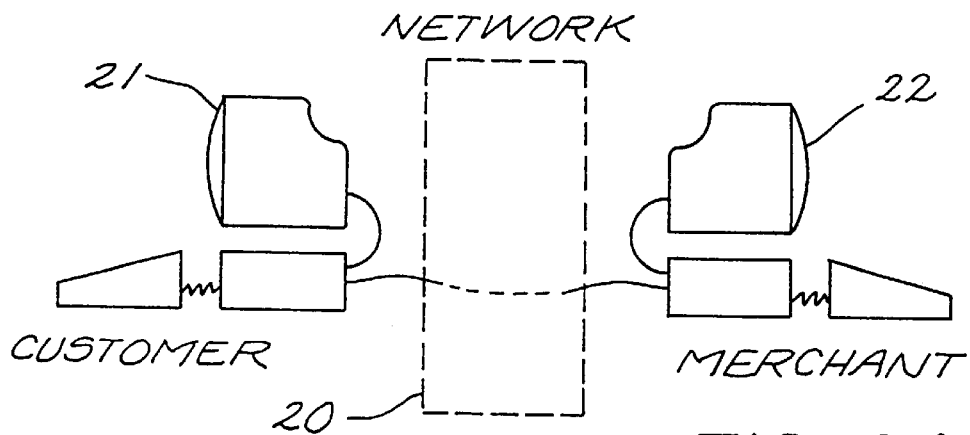

Referring to FIG. 2A, in a typical fashion, a consumer via customer computer 21 enters the network 20 and searches through various merchant computers until the consumer locates the merchant of choice and connects with merchant computer 22. Merchant computer 22 communicates the promotional material via network 20 to customer computer 21.

Figure 2B:
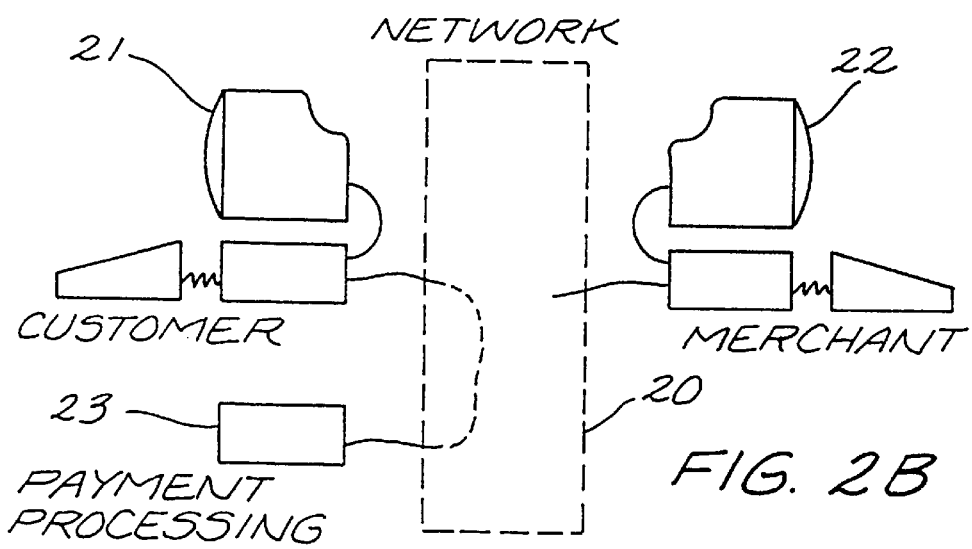

When the consumer decides to buy the service or product from merchant 22, as shown in FIG. 2B, the link with merchant computer 22 is broken and customer computer 21 links with the payment processing computer 23. In the change from merchant computer 22 to payment processing computer 23, an indicia of the URL or the product being promoted by merchant computer 22 is communicated to the payment processing computer 23.

The indicia as a URL of the last site is available through normal network operations and its handling is obvious to those of ordinary skill in the art. The product number is easily combined with the URL; thereby making the product number also available to the payment processing computer 23.

In some embodiments, the originating URL is crossed checked to a memory data base to achieve the product number. In this embodiment, the merchant structures its material so that only a single product/service is associated with a specific URL.

Using the product number (or developing the product number from the merchant's URL), the payment processing computer is able to cross reference its own memory (as described earlier) to achieve other important information including: the amount of the product/service, a description of the product/service, the name and address of the merchant, and other which will be used in later operations.

The payment processing computer 23 accepts from the customer computer 21, the credit card account number which is to be debited the amount of the product.

Figure 2C:
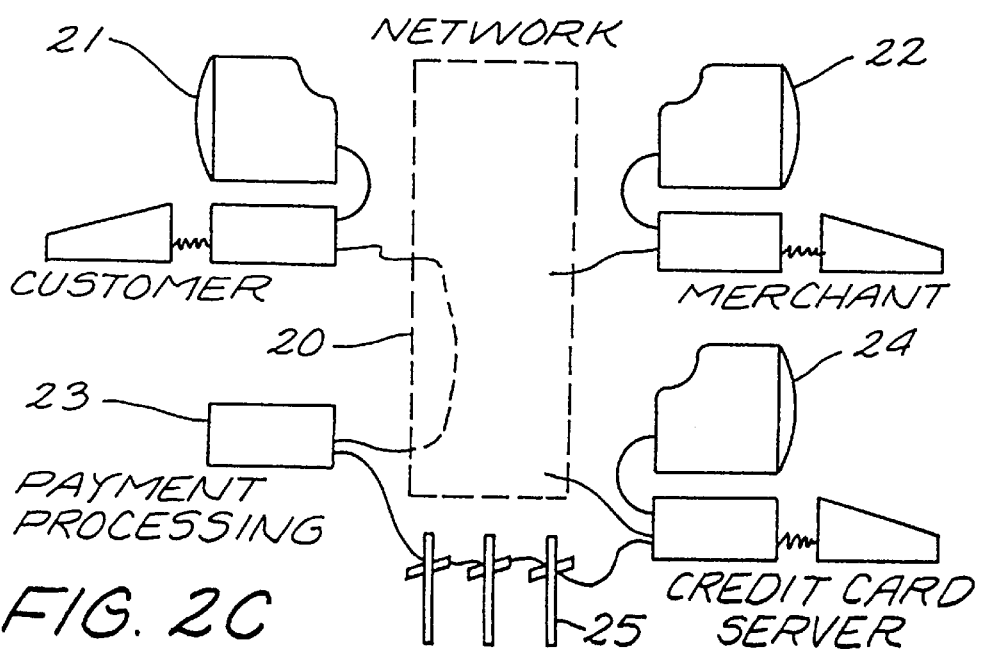

As shown in FIG. 2C, in this embodiment, while maintaining linkage with the customer computer 21, the payment processing computer 23 establishes a link via phone lines 25 with the credit card server computer 24. The credit card account number and amount is communicated to the credit card server computer 24 which responds to the payment processing computer 23 with an authorization indicia. This authorization indicia gives the acceptance or denial of the charge.

Figure 2D:
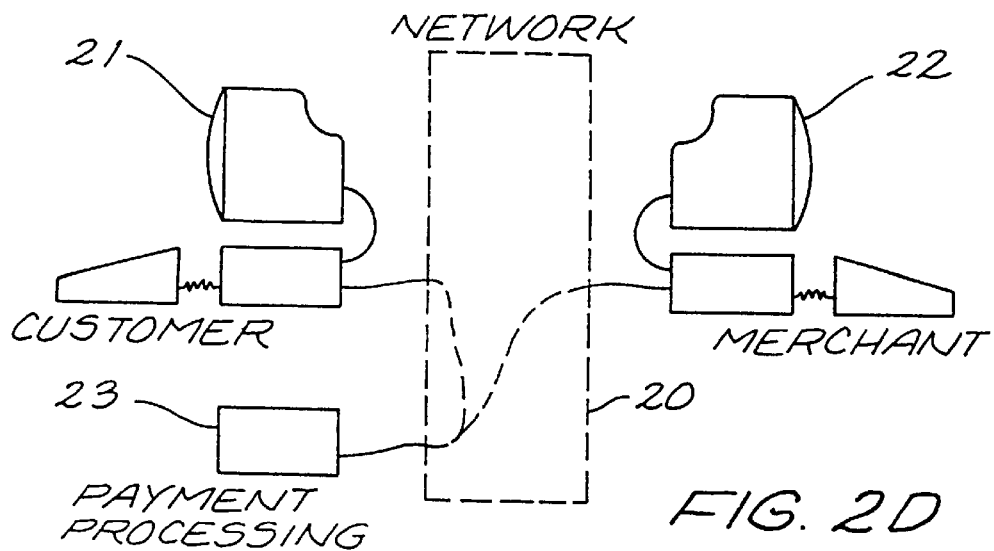

If a product is to be shipped, and if the charge has been authorized, as shown in FIG. 2D, the payment processing computer 23 connects with the merchant computer 22 and directs the merchant to ship the product to the consumer.

The payment processing computer 23 communicates a self-generated transaction indicia, and in some embodiments a password, to the customer's computer 21. The transaction indicia is generated by the payment processing computer for proper record keeping. The transaction indicia is also used by the customer to verify that an order has been generated and accepted.

Figure 2E:
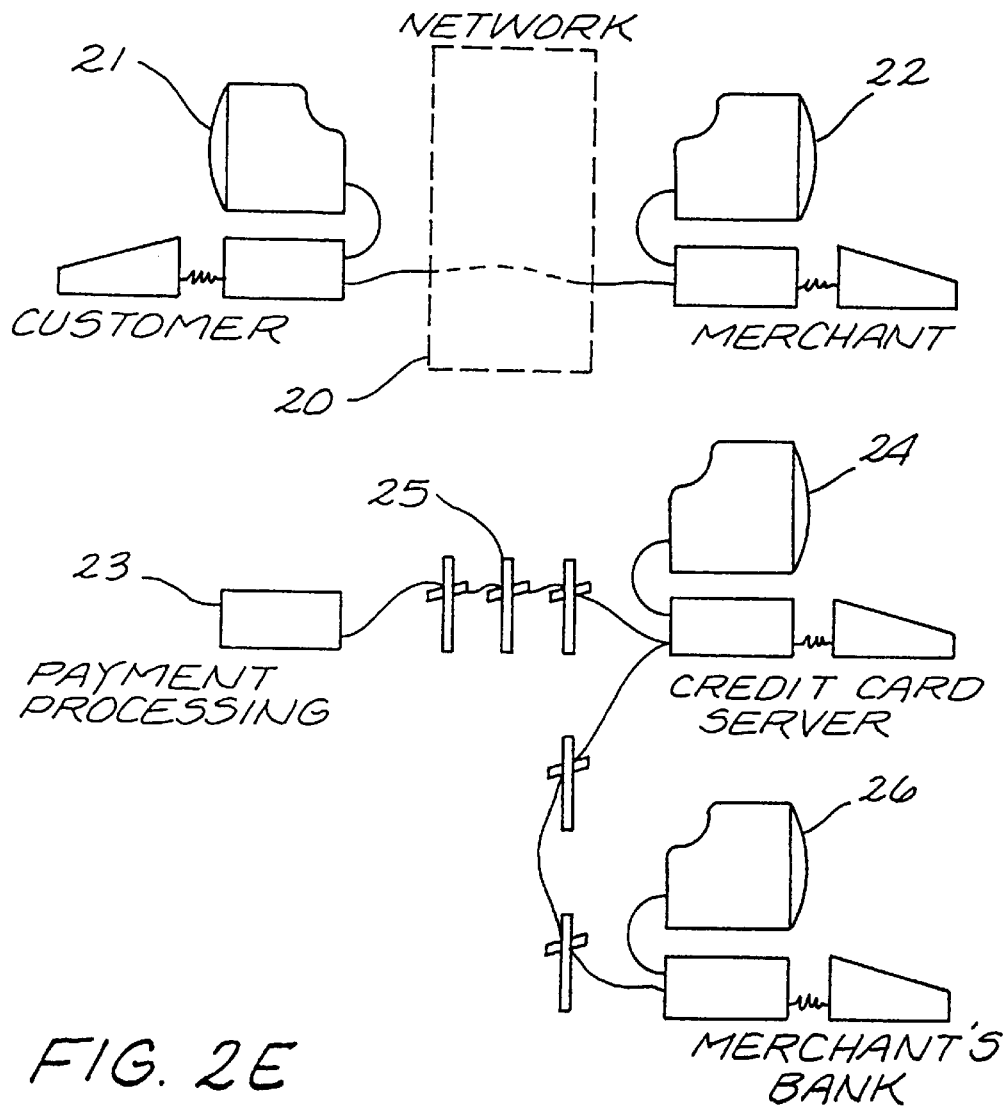

As shown in FIG. 2E, since the payment processing computer 23 has identified the product number, it is able to retrieve from its memory the URL for reconnecting the customer computer 21 with the merchant computer 22. In this manner, the entire operation is totally transparent to the consumer since they feel they have been continuously working with the merchant computer 22.

Further, using the URL's from its memory, the payment processing computer 23 is able to link the customer computer 21 to the merchant computer 22 at an address which is different from where the consumer was originally connected. In this manner, the payment processing computer 23 is able to direct the consumer to different locations which are consistent with the authorization indicia (accept/reject) on their credit card.

As example, assume, the credit card was authorized, then the consumer could be reconnected to an area which has restricted access so that the consumer can gain the information paid for; if on the other hand, the credit card was rejected, the connection would be to a page indicating such and possibly asking for another card number.

In this manner, the payment processing computer 23 is able to control the operation and interface between the customer computer 21 and the merchant computer 22.

Periodically, the payment processing computer 23 connects via the phone lines 25 with the credit card server 24 and instructs it to transfer the appropriate amount of funds to the merchant's bank computer 26 so that the merchant has access to the funds paid for his product/service provided to the consumer.

FIGS. 3A, 3B, 3C, and 3D are frontal views of one embodiment of a consumer's display screen.

Screen 30A is designed to provide the promotional information so that the consumer is attracted to purchase the product. In screen 30A is the name of the merchant company (XYZ CO.) 31, the name of the product (widget) 32, the price ($14.95) 33, and the part number (#10234) 34.

Also located on screen 30A is a software key 35 which allows the consumer to pay for the product. In this embodiment, by activating this software key 35 (typically through a click of the mouse), screen 30A is changed to screen 30B which is identical except that the software key 35 has been replaced with an order window 36.

Order window 36 allows the consumer to complete the necessary information to order the product. This includes the part number 37A, the amount 37B, and the credit card number 37C.

When the consumer is ready, the software key "Send" 37D or the software key "Cancel" 37E is activated. In the case of a cancel, the screen returns to screen 30A.

In a "send" 37D, mode, the payment processing computer contacts the bank computer and determines if the credit card is valid and if the amount is available. If the charge is authorized, the screen changes to 30C in which the order window 36 has been replaced with authorization window 38 which shows that the charge has been accepted 39A, the transaction no. (A1483) 39B, and the password ("GO") 39C which the consumer is to use with the merchant.

When this information has either been printed or committed to memory, the consumer activates software key 39D to "Proceed" to screen 30D. At this point, the consumer is able to enter the password 29 so that the restricted access is lifted. In the genealogy example, it is at this point the consumer gains access to the full report.

FIG. 4A is a flow-chart of the preferred embodiment's payment processing operation.

After start 40A, a connection is made with the customer computer 41A and the encryption software is downloaded to the customer computer 41B. Encryption software is preferably used for transmittal of the credit card number so that the integrity of the card is not jeopardized.

The consumer computer then communicates, and the payment processing computer accepts, the account number, the amount, and the identification of the product or service, 42A. A connection is made with the credit card server 41C and the account number and amount is transmitted 41D to the credit card server over the established phone lines. In response to this query, the authorization data is received 42B and the connection with the credit card server 41E is broken.

A transaction indicia is generated 41F. This transaction indicia is not the authorization data but serves as an internal monitoring system for the payment processing computer so that the accounting is kept accurate.

From the memory, the password is withdrawn 41G for the product so ordered; and, the password and transaction indicia is transmitted to the customer computer 41H.

At this point, the connection with the customer computer is terminated 41I and the program stops 40B.

FIG. 4B is a flow-chart of an alternative embodiment's payment processing operation.

After start 43A, the program connects with the customer computer 44A and at the same time obtains the merchant URL 45A. Using the merchant URL, the payment processing computer searches its memory and identifies the merchant number, the part number, and the purchase amount 44B.

The encryption software is downloaded into the customer computer 44C and the credit card account number is received 45B. A connection is then made with the credit card server computer 44D and the account number and the amount is transmitted 44E. This inquiry results in an authorization code 45C being received and the connection with the credit card server being broken 44F.

A check is then made to see if the credit card purchase was authorized 46A.

If the credit card purchase was denied, the URL to use for a rejection is withdrawn from memory 44G and the Customer computer is connected to the merchant computer at this URL 44H leaving the payment processing computer able to disconnect 44I and stop 43B.

Should the credit card purchase be accepted, 46A, then the program generates a transaction identification 44J. This transaction identification is stored along with the date, amount of purchase, and the merchant number 44K.

The password is retrieved from memory 44L and it, together with the transaction identification, is transmitted to the customer computer 44M.

From memory, the authorized URL is withdrawn 44N.

A determination, based upon stored data, is made as to the character of the product (service or goods) 46B. If the product relates to goods which are to be shipped, a shipping order including the transaction identification, the amount, the date, and address of the customer, is communicated to the merchant 44O to satisfy the order; otherwise this step is skipped.

The customer computer is then connected to the authorized URL 44P and the connection with the customer computer is terminated 44Q allowing the program to stop 43C.

FIG. 5 is a flow-chart of the operation of the merchant's computer.

After start 50A, the merchant computer connects with the customer computer 51A and communicates the promotional material 52A. The password is received from the customer 52B and is checked to see if it is the correct password 53A.

If the password is incorrect, a determination is made on if it is the customer's first try 53B; if it is, then the customer is given another chance to enter the correct password 52B. If the customer has tried twice to enter the correct password, the connection with the customer is terminated 51C and the program stops 50C.

If the password is correct, 53A, then the secure or restricted access data is communicated to the customer's computer 51D and the connection with the customer's computer is terminated 51B. The program then stops 50B.

In this manner, secure information is selectively transmitted to a customer's computer upon the presentation of a password.

It is clear from the foregoing that the present invention creates a highly improved system for acceptance and processing of payments over a distributed computer network.

What is claimed is:

1. A credit card processing system comprising:
   a) a network of computers communicating data thereon;
   b) a phone system adapted to communicate data between two points;
   c) a banking computer having,
      1) means for receiving via said phone system, a credit card number, and,
      2) means for generating an acceptance indicia based upon said credit card number;
   d) a consumer computer connected to said network of computers, said consumer computer having,
      1) means for receiving from said consumer, consumer data indicative of a consumer credit card number, and,
      2) means for communicating said consumer data via said network of computers; and,
   e) a processing computer connected to said network of computers and to said phone system, said processing computer having means for automatically,
      1) receiving said consumer data via said network of computers,
      2) communicating said consumer data via said phone system to said banking computer,
      3) receiving a consumer acceptance indicia from said banking computer, and,
      4) based upon said consumer acceptance indicia, connecting said consumer computer to said merchant computer.

2. The credit card processing system according to claim 1, wherein said processing computer further includes, based upon said consumer acceptance indica, means for communicating a message to said consumer via said network of computers.

3. The credit card processing system according to claim 1,
   a) wherein said consumer computer includes means for encrypting said consumer data; and,
   b) wherein said processing computer includes means for de-encrypting an encrypted consumer data.

4. The credit card processing system according to claim 1,
   a) further including a merchant computer connected to said network of computers; and,
   b) wherein said merchant computer selectively connects said consumer computer to said processing computer via said network of computers.

5. The credit card processing system according to claim 4, wherein said processing computer further includes, based upon said consumer acceptance indicia, means for communicating a message to said merchant computer via said network of computers.

6. The credit card processing system according to claim 4,
   a) wherein said merchant computer further includes means for communicating purchase price data to said processing computer; and,
   b) wherein said processing computer further includes means for communicating said purchase price data with said consumer data to said banking computer.

7. The credit card processing system according to claim 4, wherein said processing computer further includes means for selectively connecting said consumer computer to said merchant computer via said network of computers.

8. The credit card processing system according to claim 7, wherein said means for selectively connecting of said processing computer is responsive to said acceptance indicia.

9. A processing system for credit cards comprising an automatic apparatus having:
   a) means for receiving a consumer generated credit card data via a network of computers;

b) means for communicating said consumer generated credit card data to a banking computer;

c) means for receiving a consumer acceptance indicia from said banking computer; and, d) means for selectively connecting said consumer computer to said merchant computer via said network of computers in response to said acceptance indicia.

10. The processing system for credit cards according to claim 9, further including, means for communicating a message to said consumer via said network of computers.

11. The processing system for credit cards according to claim 9, further including means for communicating a message to a merchant computer via said network of computers.

12. The processing system for credit cards according to claim 9, further including, a) means for receiving purchase amount data via said network of computers; and, b) means for communicating said purchase price data with said consumer data to said banking computer.

13. The processing system for credit cards according to claim 9, further including means for de-encrypting an encrypted consumer data.

14. A system comprising:

a) a network of computers communicating data thereon;

b) a banking computer having means for receiving a credit card number, and, generating an acceptance indicia based thereon;

c) a consumer computer connected to said network of computers, said consumer computer having means for communicating a consumer generated credit card number via said network of computers; and, d) a processing computer connected to said network of computers, said processing computer having means for automatically, 1) receiving said consumer generated credit card number via said network of computers, 2) communicating said consumer generated credit card number to said banking computer, 3) receiving a consumer acceptance indicia from said banking computer, and, 4) based upon said consumer acceptance indicia, connecting said consumer computer to said merchant computer.

15. The system according to claim 14, wherein said processing computer further includes, based upon said consumer acceptance indica, means for communicating an a message to said consumer computer via said network of computers.

16. The system according to claim 14, a) further including a merchant computer connected to said network of computers; and, b) wherein said merchant computer selectively connects said consumer computer to said processing computer via said network of computers.

17. The system according to claim 14, a) wherein said merchant computer further includes means for communicating purchase price data to said processing computer; and, b) wherein said processing computer further includes means for communicating said purchase price data with said consumer data to said banking computer.

18. The system according to claim 14, wherein said processing computer further includes means for selectively connecting said consumer computer to said merchant computer via said network of computers.

19. The system according to claim 14, a) wherein said consumer computer includes means for encrypting said consumer data; and, b) wherein said processing computer includes means for de-encrypting an encrypted consumer data.

* * * * *